United States Patent [19]

Moghadam et al.

[11] Patent Number: 5,682,197
[45] Date of Patent: Oct. 28, 1997

[54] ELECTRONIC PANORAMIC CAMERA FOR USE WITH AN EXTERNAL PROCESSOR

[75] Inventors: Omid A. Moghadam; Stuart F. Ring; John R. Squilla, all of Rochester, N.Y.

[73] Assignee: Eastman Kodak Company, Rochester, N.Y.

[21] Appl. No.: 440,271

[22] Filed: May 12, 1995

[51] Int. Cl.[6] .............................. H04N 7/00; H04N 5/228
[52] U.S. Cl. .......................... 348/36; 348/222; 348/341; 396/296; 396/373
[58] Field of Search .................................. 348/36, 37, 38, 348/39, 341, 335, 333, 334; 354/94, 219, 222, 223; 396/296, 373; H04N 7/00, 5/228

[56] References Cited

U.S. PATENT DOCUMENTS

| | | |
|---|---|---|
| 1,282,177 | 10/1918 | Blankenhorn . |
| 4,524,381 | 6/1985 | Konishi ............................ 358/29 |
| 4,574,319 | 3/1986 | Konishi ............................ 358/335 |
| 5,045,872 | 9/1991 | Yoshimura et al. ............. 354/94 |
| 5,045,937 | 9/1991 | Myrick ............................ 358/109 |
| 5,086,311 | 2/1992 | Naka et al. ...................... 354/195.1 |
| 5,138,460 | 8/1992 | Egawa .............................. 358/224 |
| 5,262,867 | 11/1993 | Kojima ............................ 358/209 |
| 5,389,991 | 2/1995 | Naka et al. ...................... 354/159 |
| 5,481,330 | 1/1996 | Yamasaki ......................... 354/412 |

Primary Examiner—Andrew Faile
Assistant Examiner—Ngoc-Yen Vu
Attorney, Agent, or Firm—David M. Woods

[57] ABSTRACT

An electronic camera useful with a peripheral processor comprises an image sensor for producing image data, an output storage section, an electronic control processor for transferring the image data to the storage section, and a mode selector for indicating whether the camera is used for normal format pictures or for panoramic pictures. When the mode selector is set for panoramic pictures, the electronic control processor includes a panoramic mode indicator in a header with the image data. The peripheral processor keys on the mode indicator to process the tagged images into a panoramic picture. By further including alignment indicia in a view finder in the camera to aid the user in aligning adjacent images, the peripheral processor utilizes image addresses corresponding to the indicia locations to process the tagged images.

17 Claims, 3 Drawing Sheets

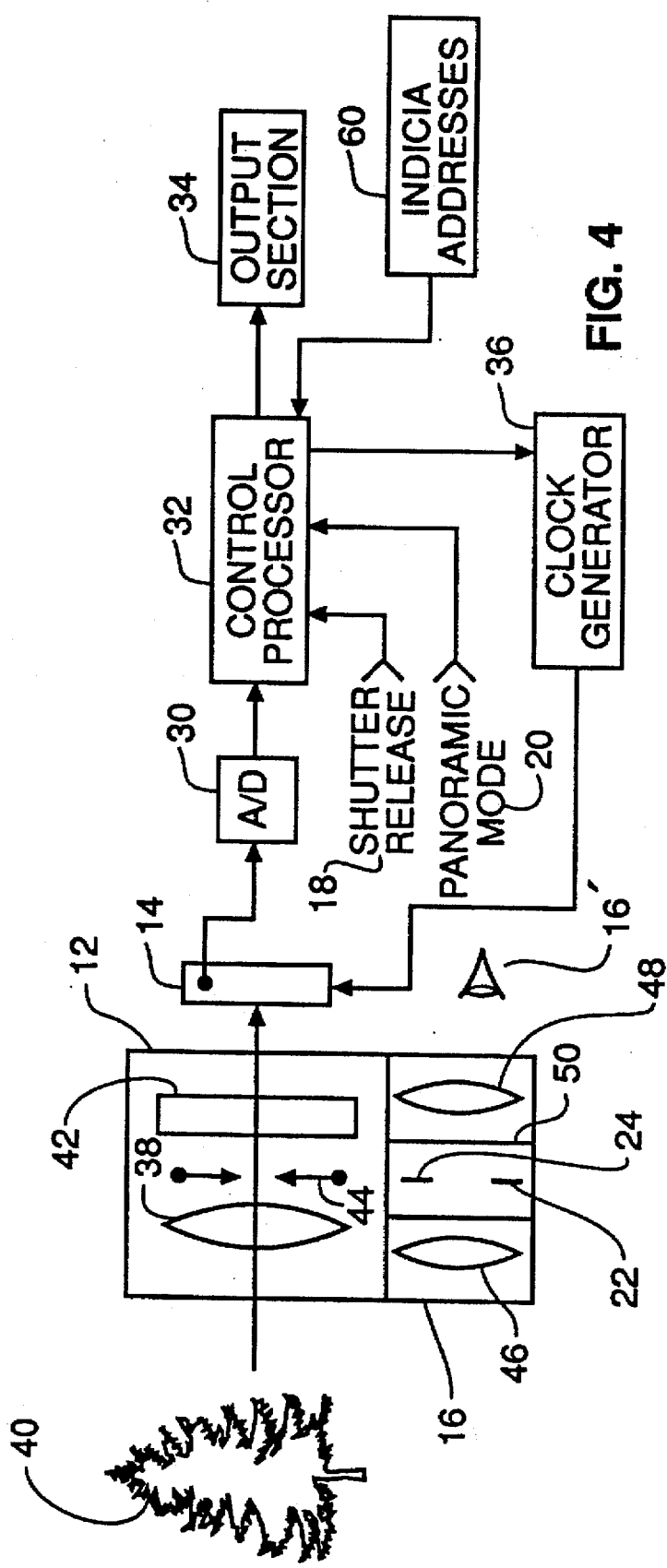
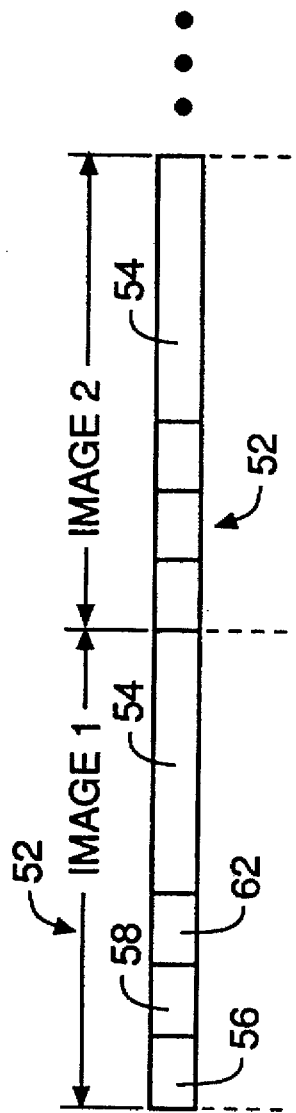
FIG. 4
FIG. 5

ELECTRONIC PANORAMIC CAMERA FOR USE WITH AN EXTERNAL PROCESSOR

FIELD OF THE INVENTION

The invention relates generally to the field of photography, and in particular to electronic photography.

BACKGROUND OF THE INVENTION

Conventional cameras are well known for capturing a panoramic image upon photographic film. In some cameras, a wider than usual strip of film is exposed with special, movable optics or camera elements in order to capture the panoramic image. For instance, U.S. Pat. No. 1,282,177 shows apparatus in which a roll film camera is mounted upon a circular support. The support has marked upon it the exact angle covered by the camera so that a series of exposures may be taken by moving the camera after each exposure exactly through the angle of view. The film is advanced after each exposure so that the consecutive exposures just touch one another, thus giving a panoramic effect on a single continuous negative.

In other cameras, a conventional format film image (e.g., conventional 35 mm format) is masked in the camera's exposure aperture to provide a panoramic effect. For instance, in U.S. Pat. No. 5,086,311, the camera includes plates that are selectively movable into the optical path for masking the exposure aperture so as to form a picture frame of a panoramic size, or for opening the whole exposure aperture for a conventional picture frame. Though merely exposing less of the conventional format during the panoramic mode, such an exposure appears as a panoramic picture after printing and enlarging of the exposed portion of the negative image.

It also has been long known, as a photographic procedure, to capture a series of conventional format pictures on film with a conventional camera and then to manually splice the resulting adjacent film, or print, images together to create a panoramic whole. In order that the adjacent images may be accurately lined up prior to capture, U.S. Pat. No. 5,138,460 shows an electronic display device, suggested for a camera capable of electronic and film capture, in which the display device simultaneously displays portions of sequentially captured electronic images in such a manner that each portion can be smoothly connected at a common junction (using the display) to form a panoramic display image. If the first portion represents the previously captured image (e.g., on film), the second image portion represents the presently viewed image, which can then be lined up with the captured image until there is an acceptable juncture. Then the second image is captured, and a panoramic composite may be produced.

The tendency in fully electronic cameras has been to employ rather elaborate measures to prepare a panoramic image. For instance, in U.S. Pat. No. 5,262,867 an electronic camera employs a global positioning system, which is responsive to a communications satellite or the like, for determining position coordinates so that the camera can combine recorded images and thereby generate a panoramic image. Such elegant solutions introduce considerable complexity into a camera. What is instead needed is a simple alternative that allows for high quality formation of panoramic images. A problem with a simple approach, particularly one that depends upon the capture of a series of separate images, is that the pictures are often offset from each other, not only horizontally but also in a direction perpendicular to the photograph. This leads to misalignment of the images forming the panoramic image and makes subsequent manual or electronic splicing much more difficult. On the other hand, if a single exposure is used for the entire panoramic image, the resolution of an image sensor limits the quality of a panoramic image.

SUMMARY OF THE INVENTION

The present invention is directed to method and apparatus for overcoming one or more of the problems set forth above. Briefly summarized, according to one apparatus aspect of the present invention, an electronic camera comprises an image sensor for producing image data, an output section, and an electronic control processor for transferring the image data to the output section. In the improvement according to the invention, the camera includes a mode selector for indicating that the camera is to be used for panoramic pictures, and the electronic control processor includes a panoramic mode indicator with the image data when the mode selector is set for panoramic pictures.

The advantage of the invention centers on the maintenance of simplicity in the camera, while still allowing the choice of normal format or panoramic images. By simply adding a panoramic mode indicator to the image data, for instance in a header accompanying the image data, and by aligning indicia in the viewfinder with a sequence of images that will form the panoramic image, the captured images are simply conditioned for subsequent processing that will seamlessly join the images into a panoramic whole.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 4 is a block diagram of the camera according to the present invention;

FIG. 5 is a diagram of the file format of the digital image information produced by the camera;

DETAILED DESCRIPTION OF THE INVENTION

Figure 1:
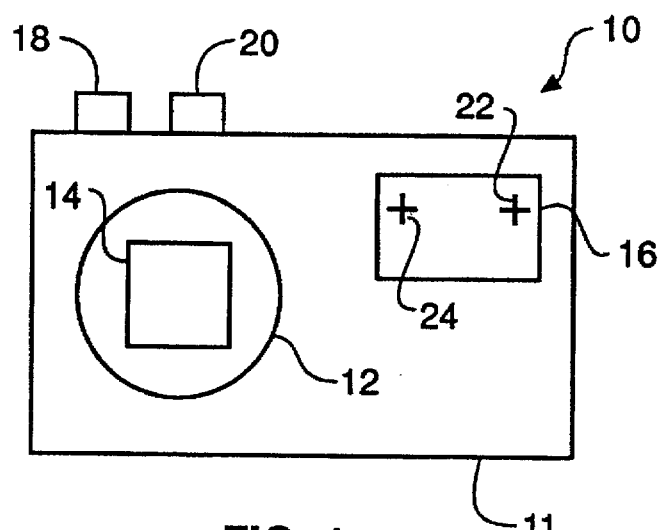
FIG. 1 shows a frontal view of a camera according to the present invention.

Referring to FIG. 1, an electronic panoramic camera 10 according to the present invention includes an optical section 12, an image sensor 14 (seen through the optical section 12), a viewfinder 16, a shutter release 18, and a panoramic mode switch 20. The view finder 16 includes a panoramic alignment means shown as two spaced indicia 22, 24. The mode switch 20 allows operation of the camera 10 in a normal mode for producing images of conventional format or in a panoramic mode for producing images tagged for panoramic processing according to the invention.

Figure 2:
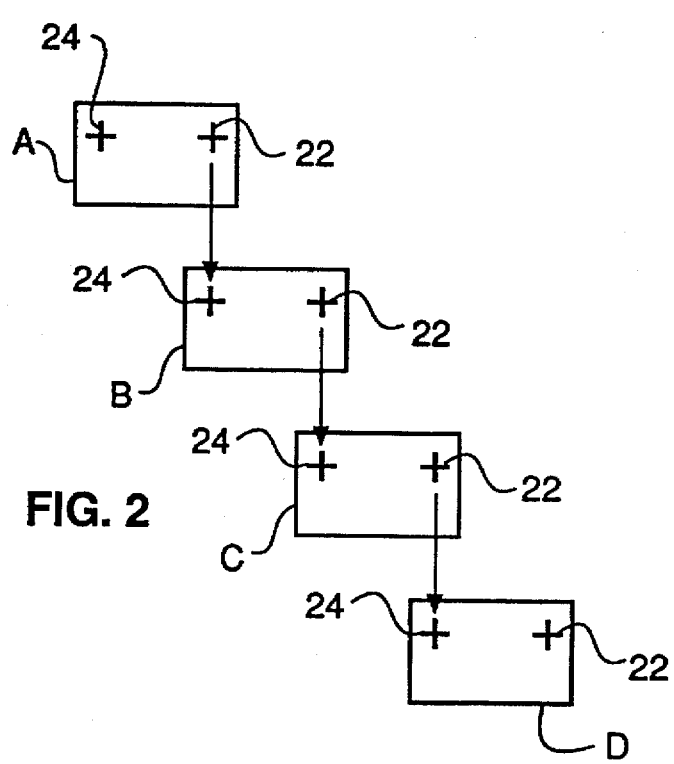
FIG. 2 is a diagram illustrating the use of a camera viewfinder according to the present invention for a sequence of images.
Figure 3:
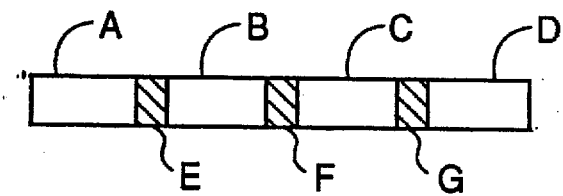
FIG. 3 is a diagram illustrating a series of images joined together to form a panoramic image.

In operation, as shown in FIG. 2, the photographer notes the alignment of the first indicia 22 with a first feature in the scene and takes the first exposure (as indicated by exposure position A). The photographer then displaces the field of view of the camera 10 sufficiently to align the alternate indicia, that is, the second indicia 24, with the first feature (as shown by exposure position B), and takes the second exposure. This process can then be repeated as desired to produce a panoramic image of any width. For instance, in exposure position B, the alignment of the first indicia 22 with a second feature is noted, and the camera 10 is again displaced sufficiently to align the second indicia 24 with the second feature (as shown by exposure position C). A third exposure is then taken. This procedure can be repeated for a third feature (position D), and so on. The separate images represented by exposure positions A, B, C, and D are subsequently joined at overlapping junctures E, F, and G, as shown in FIG. 3, to form a panoramic image. The juncture areas E, F, and G are consequently common to adjacent images.

As shown in the camera block diagram of FIG. 4, the analog output of the image sensor 14 is converted into a digital image signal by an analog/digital (A/D) converter 30 and thereafter applied to a control processor 32. The shutter release 18 and the panoramic mode switch 20 provide inputs to the control processor 32 as to the selected moment of image capture and to the mode of image capture (panoramic vs. conventional format), respectively. The digital image from the control processor 32 is then applied to the output section 34, which may include a storage device such as a resident (buffer) memory, a removable memory device (such as an integrated circuit memory card), a magnetic medium, or the like. The output section 34 may also include a cable connection, or the like, to a downstream processor, such as the digital processor shown in FIG. 6.

The image sensor 14 is driven by a clock generator 36 pursuant to instructions from the control processor 32. In particular, the control processor 32 initiates a capture clock sequence from the clock generator 36 upon receipt of a trigger signal from the shutter release 18. For purpose of illustrating the capture elements, the optical section 12 includes a lens 38 for directing image light from an object 40 upon the sensor 14, and a shutter 42 and a diaphragm 44 for regulating the quantity of image light exposed upon the image sensor 14. In lieu of the shutter 42, the image sensor 14 can be conventionally driven by the clock generator 36 to provide electronic shuttering. In order to visually frame the images (from an eye position 16'), the view finder 16 is shown as an optical view finder having a pair of lenses 46, 48 and the two indicia 22, 24 inscribed on a ground glass 50, or a like type of support.

The control processor 32 generates the digital image signal in a digital format such as shown in FIG. 5, that is, including a header 52 and an image trailer 54. According to the invention, a sequence of such image trailers, and their corresponding headers, may be used to form a sequence of panoramic image segments. The function of the header 52 is to tag image segments for downstream panoramic processing, and to provide other data useful in the subsequent concatenation of the panoramic image segments. When the panoramic mode switch 20 is actuated, and the panoramic mode is accordingly selected, the control processor 32 inserts a panoramic mode indicator into a mode indicator field 56 in the header 52 indicating that the camera is being operated in the panoramic mode. The mode indicator also indicates, by its presence, which among the sequence of images are to be combined into a panoramic image. In addition, the number and the order of the exposures are input into a panoramic sequence field 58 when the camera is in the panoramic mode. The number and order specify the number of image segments in a particular panoramic picture sequence, and the order of the panoramic picture within a sequence of panoramic pictures, respectively. This is done, for example, to handle a plurality of panoramic pictures taken in sequence, wherein it is necessary to know when one panoramic picture stops and the next one starts.

Figure 6:
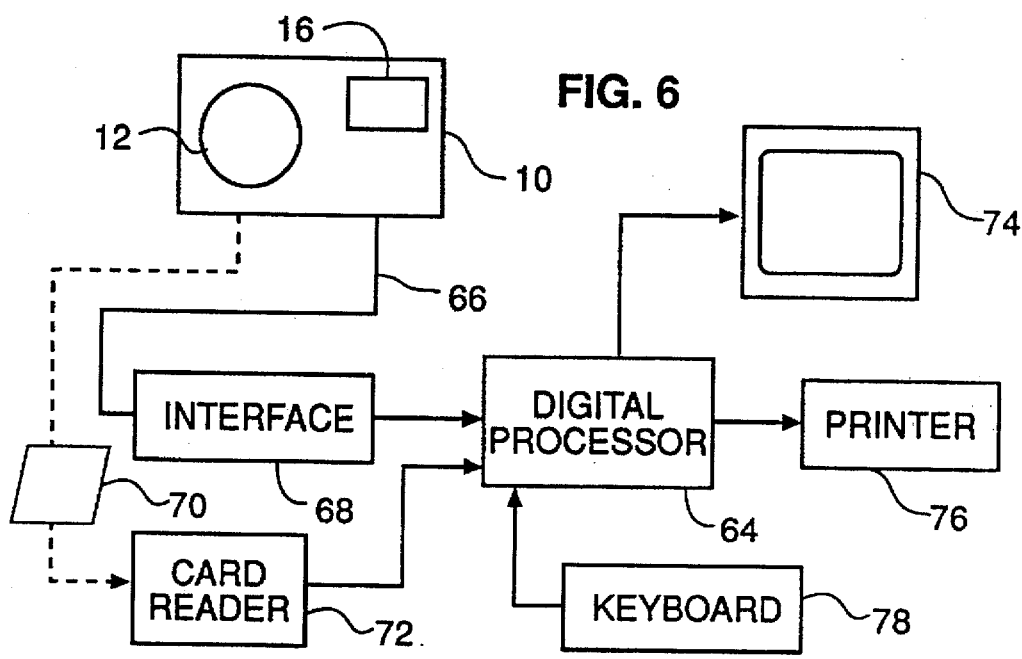
FIG. 6 is a schematic diagram of a digital processor and ancillary elements that are useful for processing the panoramic images obtained according to the invention.

Since subsequent processing performed in the digital processor of FIG. 6 will link the series of pictures (in the panoramic mode) based on the location of the indicia marks 22, 24, either the indicia locations are predetermined and known to the downstream processor or the addresses of the indicia are stored in an indicia address memory 60 and input to the control processor 32. In the latter case, the indicia addresses are recorded in an indicia address field 62 of the header 52. In either case, the area of the image is a two-dimensional array of image pixels, and the indicia addresses represent the x,y locations of the indicia 22, 24 within the image area.

The digital image information represented in the format shown in FIG. 5 is downloaded to a peripheral digital processor 64, as shown in FIG. 6, for further processing into a digital panoramic image. The downloading can be accomplished in a number of ways, for instance by a cable connection 66 through an interface 68, or by removable media, such as a memory card 70, through a card reader 72. A suitable display 74 is connected to the digital processor 64 for displaying the images, and a printer 76 is connected to print out the images. A keyboard 78 is also connected for use in the processing of panoramic images. The digital processor 64, which can be part of a conventional programmed computer, utilizes conventional processing techniques to process the digital image information according to the data stored in the image file header 52. Basically, the peripheral processor 64 keys on the mode indicator field 56 to identify the tagged images that are to be joined into a panoramic picture. By further keying on the alignment indicia 22, 24 in the viewfinder 16, the peripheral processor 64 utilizes image addresses corresponding to the indicia locations to define the juncture between the tagged images and to accordingly perform the joinder between the images.

Figure 7:
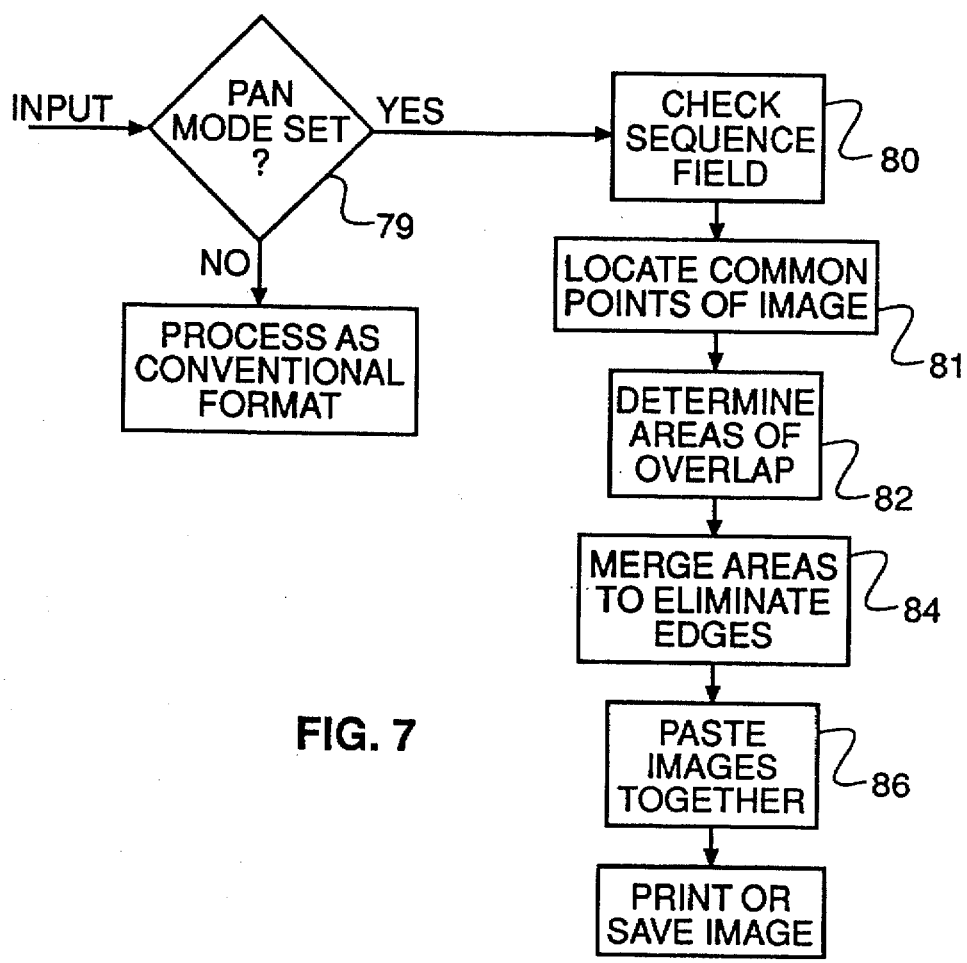
FIG. 7 is a flow chart for the operation of the digital processor shown in FIG. 6.

For example, as shown in the flowchart of FIG. 7, the mode indicator field 56 in the digital image signal is first checked in a pan decision stage 79 to determine if the images are part of a panoramic sequence. If the pan mode has been enabled, the panoramic sequence field 58 is checked in a sequence stage 80 to determine the number of images in the panoramic image and the order of the panoramic image in the sequence of digital data being input to the processor. Then the common points of exposure are located in the exposure sequence in an indicia location stage 81. At this stage, the addresses for the indicia are loaded, either from memory resident in the processor 64 or from the indicia address field 62 in the header 52. The overlap stage 82 determines the areas of exposure overlap. Conventional techniques are employed in the merging stage 84 to blend the images together to eliminate any visible boundary between two consecutive exposures. The full panoramic image is then formed in the compositing stage 86 by seamlessly concatenating the several segments of images. The final image is then saved, printed, transmitted, etc., and the processing is completed. FIG. 7 is exemplary of a variety of well-known processes that could be used to join the panoramic image segments, and that would be fully within the capability of the person of ordinary skill in these matters.

The invention has been described with reference to a preferred embodiment. However, it will be appreciated that variations and modifications can be effected by a person of ordinary skill in the art without departing from the scope of the invention.

PARTS LIST 10 camera
11 camera body
12 optical section
14 image sensor
16 viewfinder
16' eye position
18 shutter release
20 panoramic mode switch
22 first indicia
24 second indicia
30 A/D converter
32 control processor
34 output section
36 clock generator
38 lens
40 object
42 shutter
44 diaphragm
46 viewfinder lens
48 viewfinder lens
50 ground glass
52 header
54 image trailer
56 mode indicator field
58 panoramic sequence field
60 indicia address memory
62 indicia address field
64 digital processor
66 cable connection
68 interface
70 memory card
72 card reader
74 display
76 printer
78 keyboard
79 pan decision stage
80 sequence stage
81 indicia location stage
82 overlap stage
84 merging stage
86 compositing stage

We claim:

1. An electronic camera comprising an image sensor for producing image data, an output section from which the image data is communicated to an external processor, and an electronic control processor for transferring the image data to the output section, the improvement wherein the camera includes a mode selector for indicating whether the camera is to be used for panoramic pictures or for conventional format pictures, panoramic alignment indicia for aligning the camera relative to a subject at junctures defined by the indicia, and the electronic control processor includes a panoramic mode indicator and image addresses for the indicia with the image data when the mode selector is set for panoramic pictures in order to tag the image data for downstream processing in the external processor.

2. A camera as claimed in claim 1 wherein the camera captures a sequence of images and the panoramic mode indicator indicates which among the sequence of images are to be combined into a panoramic picture.

3. A camera as claimed in claim 2 wherein the panoramic alignment indicia is used for aligning the camera relative to the sequence of images, such alignment facilitating subsequent production of a panoramic picture of the aligned sequence of images.

4. A camera as claimed in claim 2 wherein the electronic control processor also includes a number and order of the sequence of images with the image data when the mode selector is set for panoramic pictures, the number and order specifying the number of images in a particular panoramic picture and the order of the panoramic picture within a sequence of panoramic pictures, respectively.

5. An electronic imaging system including the camera as claimed in claim 2 wherein the external processor generates the panoramic picture, and wherein the external processor is responsive to the panoramic mode indicator for determining which images are to be processed into the panoramic picture.

6. An electronic camera comprising an image sensor for producing image data from a sequence of images, a storage section from which the image data is communicated to an external processor, and an electronic control processor for transferring the image data to the storage section, the improvement wherein the camera includes a mode selector for indicating whether the camera is to be used for panoramic pictures or for conventional format pictures, a viewfinder having panoramic alignment indicia that are used for aligning the camera relative to the sequence of images for subsequently generating a panoramic picture, and the electronic control processor records a panoramic mode indicator and image addresses for the indicia in a data field accompanying the image data for each image when the mode selector is set for panoramic pictures in order to tag the image data for downstream processing in the external processor.

7. A camera as claimed in claim 6 wherein the electronic control processor also includes a number and order of the sequence of images with the image data when the mode selector is set for panoramic pictures, the number and order specifying the number of images in a particular panoramic picture and the order of the panoramic picture within a sequence of panoramic pictures, respectively.

8. An electronic imaging system including the camera as claimed in claim 6 wherein the external processor generates the panoramic picture, and wherein the external processor is responsive to the data field including the panoramic mode indicator for determining which images are to be processed into a panoramic picture.

9. A system as claimed in claim 8 wherein the storage section in the camera includes a removable storage element that is used to transfer the image data, the panoramic mode indicator and the image addresses for the indicia in the data field accompanying the image data from the camera to the external processor.

10. An electronic camera comprising an image sensor for producing image data from a sequence of images, a storage section from which the image data is communicated to an external processor, and an electronic control processor for transferring the image data to the storage section, the improvement wherein the camera includes a mode selector for indicating the camera is to be used for panoramic pictures, a viewfinder having at least two spaced indicia that are used for aligning the camera relative to a subject at junctures defined by said indicia when capturing a sequence of images for a panoramic picture, and means for storing addresses locating the indicia within an image field captured by the camera, wherein the electronic control processor records a panoramic mode indicator and the addresses locating the indicia in a header accompanying the image data for each image when the mode selector is set for panoramic pictures.

11. A camera as claimed in claim 10 wherein the electronic control processor also includes a number and order of the sequence of images with the image data when the mode selector is set for panoramic pictures, the number and order specifying the number of images in a particular panoramic picture and the order of the panoramic picture within a sequence of panoramic pictures, respectively.

12. An electronic imaging system including the camera as claimed in claim 10 wherein the external processor generates the panoramic picture, and wherein the external processor is responsive to the panoramic mode indicator in the header for determining which images are to be processed into a panoramic picture.

13. A system as claimed in claim 12 wherein the storage section in the camera includes a removable storage element that is used to transfer the image data, the panoramic mode indicator and the image addresses for the indicia in the header accompanying the image data from the camera to the external processor.

14. A camera used for capturing a sequence of images to generate a panoramic picture, the improvement wherein the camera includes a viewfinder having at least two spaced indicia that are used for aligning the camera relative to a subject at junctures defined by said indicia when capturing the sequence of images for the panoramic picture and means for storing addresses locating the indicia within an image field captured by the camera, said addresses subsequently used in processing the images to generate the panoramic picture.

15. A method for generating a panoramic picture from a sequence of conventional format images captured by an electronic camera, said method comprising the steps of:

indicating whether the camera is to be used for capturing a panoramic image or a conventional image;

defining the juncture between images by relation to indicia displayed in a viewfinder on the camera;

generating image data corresponding to a related sequence of conventional format images;

including a panoramic mode indicator and image addresses for the indicia with the image data corresponding to the related sequence of conventional images when the camera is to be used for capturing the panoramic image in order to tag the image for downstream processing;

selecting image data for processing by reference to the panoramic mode indicator; and processing the selected image data into panoramic picture by reference to the image addresses defining the juncture between images.

16. A method for generating a panoramic picture in an external processor from a sequence of conventional format images captured by an electronic camera, said method comprising the steps of:

indicating that the camera is to be used for capturing a panoramic image;

aligning a related sequence of conventional format images by use of two panoramic indicia in a viewfinder of the camera;

capturing each related image in the sequence by displacing the field of view of the camera for each image such that alternate panoramic indicia for adjacent images are aligned relative to a common feature;

generating image data corresponding to the related sequence of conventional images;

storing addresses locating the indicia within an image field captured by the camera; and including a panoramic mode indicator and the addresses locating the indicia with the image data corresponding to the related sequence of conventional images in order to process the image data into the panoramic picture in the external processor.

17. The method as claimed in claim 16 further comprising the steps of:

selecting image data for processing by reference to the panoramic mode indicator and the addresses locating the indicia; and processing the selected image data into the panoramic picture.

* * * * *